United States Patent [19]

Nussbaum

[11] E Re. 29,966

[45] Reissued Apr. 17, 1979

[54] HEAT PUMP WITH FROST-FREE OUTDOOR COIL

[75] Inventor: Otto J. Nussbaum, Huntsville, Ala.

[73] Assignee: Halstead Industries, Inc., Scottsboro, Ala.

[21] Appl. No.: 831,032

[22] Filed: Sep. 6, 1977

Related U.S. Patent Documents

Reissue of:

[64] Patent No.: 3,918,268
Issued: Nov. 11, 1975
Appl. No.: 435,673
Filed: Jan. 23, 1974

[51] Int. Cl.[2] ..... F25B 13/00

[52] U.S. Cl. ..... 62/150; 62/80; 62/156; 62/160; 62/324

[58] Field of Search ..... 62/150, 80, 156, 160, 62/324

[56] References Cited

U.S. PATENT DOCUMENTS

| | | | |
|---|---|---|---|
| 3,135,317 | 6/1964 | Goettl | 62/276 X |
| 3,159,981 | 12/1964 | Husbey | 62/156 |
| 3,189,085 | 6/1965 | Eberhart | 165/29 X |
| 3,209,551 | 10/1965 | Jentet | 62/324 X |
| 3,365,902 | 1/1968 | Nussbaum | 62/160 X |
| 3,466,888 | 9/1969 | Kyle | 62/156 |
| 3,529,659 | 9/1970 | Trask | 62/324 X |
| 3,783,635 | 1/1974 | Perez | 62/276 |
| 3,786,227 | 1/1974 | Seipp et al. | 62/276 X |

*Primary Examiner*—Albert W. Davis, Jr.
*Attorney, Agent, or Firm*—Thomas H. Murray

[57] ABSTRACT

A heat pump having an auxiliary outdoor coil equipped with heating means preventing the surface temperature during the heating cycle from falling below 32° C. The heating means comprises an electrical resistance heater in thermal contact with the fins of the outdoor coil such that heat is transferred to the fins by conduction. The system incorporates means to permit functioning immediately upon return to the heating cycle from a cooling cycle even though the pressure in the receiver of the system initially exceeds that in the indoor coil. Additionally, the system incorporates means for protecting the compressor from liquid floodback when changeover occurs from heating to cooling.

5 Claims, 6 Drawing Figures

COOLING CYCLE

HEATING CYCLE

FIG. 5. PUMP DOWN OPERATION BEFORE CHANGEOVER TO COOLING
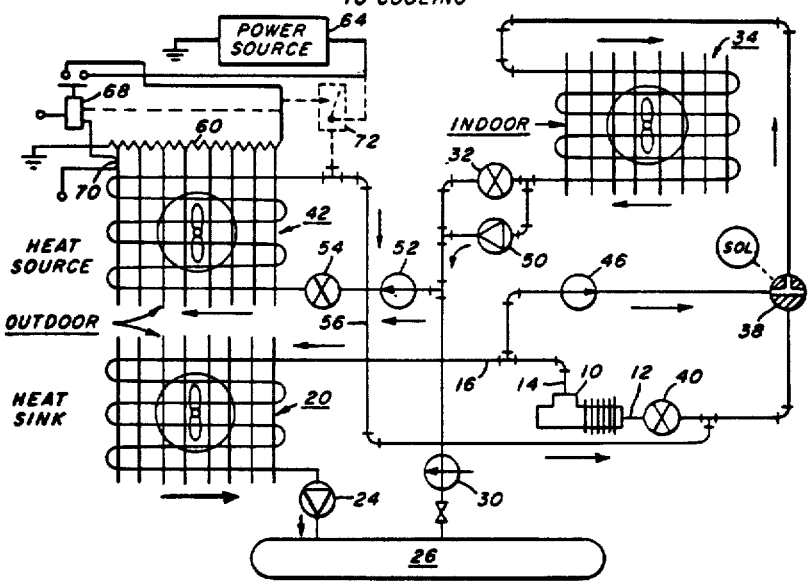
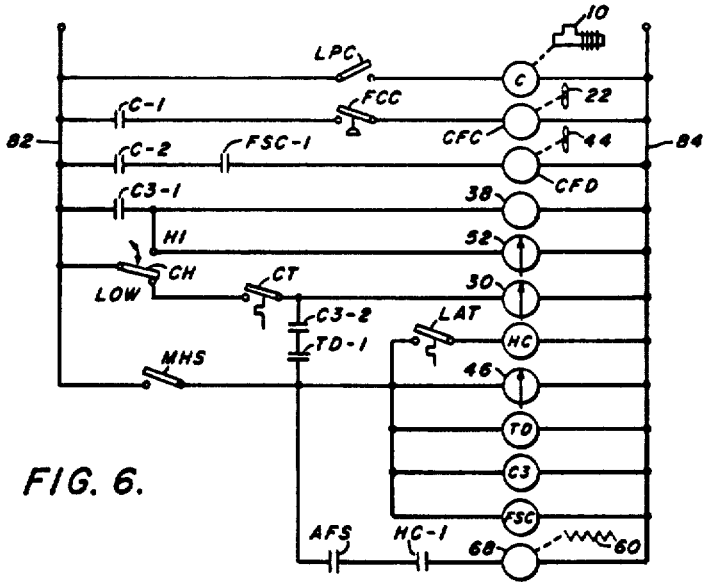
FIG. 6.

HEAT PUMP WITH FROST-FREE OUTDOOR COIL

Matter enclosed in heavy brackets [ ] appears in the original patent but forms no part of this reissue specification; matter printed in italics indicates the additions made by reissue.

BACKGROUND OF THE INVENTION

In a heat pump, compressed refrigerant is evaporated in an outdoor evaporation coil, the expanded refrigerant being thereafter compressed and passed through a condenser which extracts heat from the compressed refrigerant for heating the interior of a building. During warm weather, the refrigeration cycle is reversed and the system used as an air conditioner. Heat pumps of this type which are installed in cold climates must operate at outdoor air temperatures below 32° F. and sometimes as low as −20° F. Under these conditions, the evaporating temperature of the refrigerant in the outdoor coil drops to a point at which the coefficient of performance of the heating system is unreasonably low. To make such a system commercially feasible, electric resistance heaters disposed in front of the fan for the interior condenser have been used to supply the needed additional heating capacity; however, this further lowers the overall system coefficient of performance. Furthermore, operation at outdoor air temperatures below +32° F. results in frost accumulation on the outdoor coil surface, which is normally removed by periodically reversing the system to the cooling cycle for defrosting of the outdoor coil. In such defrost operations, the supplemental indoor heating coil must not only supply the entire heating requirement but must also compensate for the cooling effect of the indoor coil which temporarily becomes an evaporator. During a defrost operation, therefore, the power consumption of the system may nearly double since both the compressor and the maximum resistance heater demand are imposed on the power supply.

In an effort to overcome this problem, systems have been devised for heating the outdoor evaporator coil to prevent the accumulation of frost. One such system, for example, is shown in Trask U.S. Pat. No. 3,529,659 wherein an effort is made to prevent frost accumulation with the use of radiant heat from an electrical heating element. The amount of heat available by radiation, however, is relatively slight, and, as a result, systems utilizing this arrangement have not achieved commercial acceptance.

Another problem encountered with heat pumps is their inability to function immediately upon changeover to the heating cycle since the pressure in the receiver of the system may initially exceed the pressure in the indoor coil which becomes a condenser during the heating cycle. This problem is clearly described, for example, in Henderson U.S. Pat. No. 2,763,130. If, in fact, the pressure in the receiver is higher than that in the indoor coil at the start of the heating cycle, the condensate formed in the indoor coil will accumulate in the coil which will rapidly fill up with liquid refrigerant and deprive the remainder of the system of its charge without performing any useful heating function.

SUMMARY OF THE INVENTION

In accordance with the present invention, a new and improved heat pump system is provided which overcomes the disadvantages of prior art systems in that it allows continuous system operation at an economically practical coefficient of performance and completely eliminates the need for periodic reverse defrost operations regardless of outdoor ambient temperature or humidity. Additionally, the system of the invention incorporates means to permit the system to function immediately upon changeover to the heating cycle from a cooling cycle even though the pressure in the receiver of the system may initially exceed that in the indoor coil. A still further feature of the invention resides in the provision of means for protecting the compressor from liquid floodback when reversal occurs from the heating cycle to the cooling cycle.

Specifically, in accordance with the invention, two outdoor heat exchangers are provided, one of which is used as a condenser (heat sink) during a summer cooling cycle while the other is utilized as the evaporator (heat source) for a heating cycle. In order to prevent the accumulation of frost or ice on the outdoor heat source coil, its surface temperature is always maintained above 32° F. by means of an electrical resistance heating element which is in intimate thermal contact with the fins of the coil whereby heat is transferred from the heating element or elements to the fins by conduction in contrast to prior art systems wherein radiation was relied upon. The electrical resistance heating coil can be controlled by means of a thermistor which senses the surface temperature of the outdoor coil fins or by means of a pressure switch which senses a drop in pressure at the output of the outdoor evaporator coil. In this manner, it is possible to operate at evaporating temperatures of +20° F. or higher so that a coefficient of performance of not less than 4.5 can be anticipated.

With the outdoor coil surface always above the freezing point of water, no defrost operation will ever be required. Since this will allow continuous system operation, without frequent interruptions for defrost, it is feasible to utilize less compressor horsepower for a greater heating load. In addition, the usual defrost controls can be eliminated and frequent reversing of the refrigerant cycle with its inherent danger to the compressors is avoided.

By using two outdoor coil circuits rather than a single coil as both an evaporator (heat source) and condenser (heat sink), possible damage to the system compressor is eliminated due to liquid refrigerant reaching the compressor intake upon reversal from a cooling to a heating cycle because of the large quantities of liquid refrigerant held in a condenser in cool weather which are likely to reach the compressor and its valves immediately upon reversal.

Further, in accordance with the invention, in order to permit the system to function immediately upon changeover to a heating cycle from a cooling cycle, refrigerant from the receiver is permitted to flow through the heat source outdoor coil for a short period of time, usually about 2 minutes, at the beginning of the heating cycle. During this initial short period when the receiver is connected to the outdoor heat source coil, condensing pressure in the indoor coil is permitted to build up while the liquid pressure in the receiver falls. At the same time, while the condensing pressure is permitted to build up initially, a sufficient refrigerant charge is provided from the receiver to the active heating circuit.

The above and other objects and features of the invention will become apparent from the following detailed description taken in connection with the accompanying drawings which form a part of this specification, and in which:

FIG. 5 is a schematic diagram showing the operation of the system of the invention immediately prior to changeover from a heating to a cooling cycle; and FIG. 6 is a schematic electrical circuit diagram showing the controls for the valves, fans, motors and other elements of the system of FIG. 1.

Figure 1:
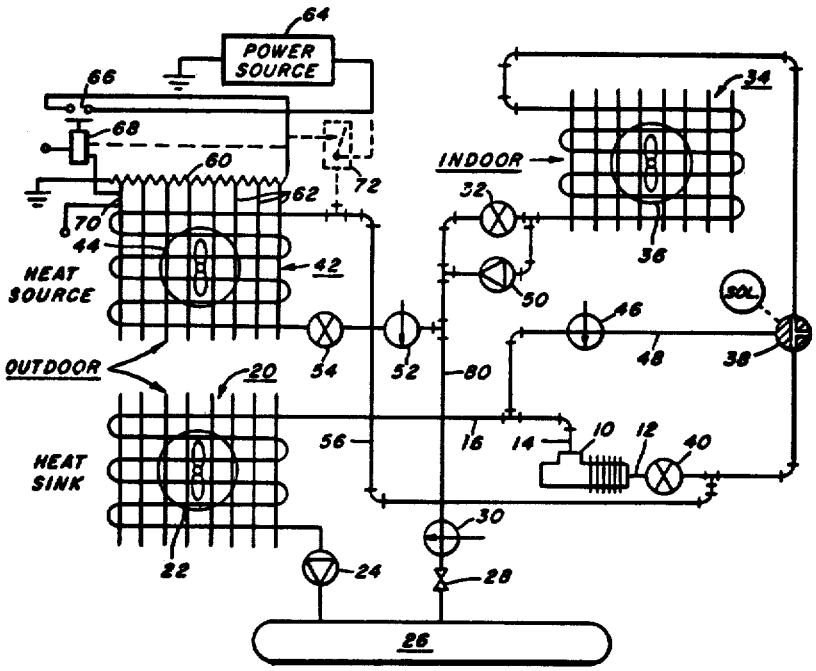
FIG. 1 is a schematic view of the entire heat pump system of the invention.

With reference now to the drawings, and particularly to FIG. 1, the system shown includes a compressor 10 of conventional construction having an input or suction intake 12 and an output or discharge side 14. The compressor discharge 14 is connected through a conduit 16 to the inlet side of a first outdoor heat exchanger 20 which acts as a condenser during a normal refrigeration cycle. The heat exchanger 20 is provided with a motor-driven cooling fan 22 in accordance with usual practice. The exit side of the heat exchanger 20 is connected through a check valve 24 to a receiver 26. The receiver 26, in turn, is connected through a cut-off valve 28, a solenoid operated shut-off valve 30 and conduit 80 to an expansion device 32 connected to the inlet side of an indoor heat exchanger 34 again provided with a motor-driven fan 36. The outlet side of the indoor heat exchanger is connected through a three-way solenoid-operated valve 38 and through a pressure regulating valve 40 back to the inlet side 12 of the compressor 10. It will be appreciated that the system just described is a normal air-conditioning refrigeration system wherein the indoor heat exchanger 34 acts as an evaporator and the outdoor heat exchanger 20 acts as a condenser.

During a heating cycle, the heat sink coil 20 is not used. Rather, a heat source outdoor coil 42 is employed. Coil 42 is again provided with a motor-driven fan 44 as shown, although it should be understood that a single fan may be used for both fans 22 and 44 shown herein. To effect a heating cycle, valve 38 is reversed so as to connect the pressure side 14 of the condenser 10 through a solenoid-operated valve 46, conduit 48 and valve 38 to the outlet side of the indoor heat exchanger 34. Refrigerant forced into the coil of heat exchanger 34 will now flow through a check valve 50 and a solenoid-operated valve 52, which is opened during a heating cycle, to an expansion valve 54 connected to the inlet of the heat source heat exchanger 42. As will be explained hereinafter, the solenoid-operated valve 30 is initially maintained open at the beginning of a heating cycle to permit refrigerant to flow from the receiver 26 to the heat source coil 42; and is thereafter closed.

The outlet side of the heat exchanger 42 is connected through a conduit 56 back to the inlet side 12 of compressor 10 through pressure-regulating valve 40. With this arrangement, refrigerant will first flow through the indoor coil or heat exchanger 34 via valves 46 and 38; whereupon the heat of the refrigerant is transferred to the indoor atmosphere by the fan 36. From the heat exchanger 34, the compressed refrigerant flows through check valve 50 and open solenoid valve 52 to the expansion device 54 at the second outdoor heat exchanger or heat source 42 where the refrigerant expands, thereby absorbing heat. The expanded refrigerant is then returned back to the inlet side of the compressor 10 via the conduit 56.

In the condition just described, heat from the exterior atmosphere is transferred to the interior via the indoor heat exchanger 34 which now acts as a condenser rather than an evaporator. When, however, the outdoor temperature drops to 32° F. or lower, frost and/or ice will form on the fins of the outdoor heat exchanger or heat source 42, thereby reducing its heat exchange efficiency materially. Accordingly, it is desirable to provide some means for preventing the surface temperature of the fins from dropping below 32° F.

For this purpose, and in accordance with the invention, an electrical resistance heating means 60 is provided in intimate contact with the fins 62 of the heat exchanger 42 whereby heat from the resistance heater will be transferred to the fins by conduction. The resistance heater 60 may be connected to a power source 64 through normally-open contacts 66 of a relay 68. The relay 68, in turn, is controlled by a thermistor 70 or the like in contact with the fins 62, the arrangement being such that when the temperature falls to 32° F., the current through the thermistor 70 will increase to the point where relay 68 is energized, thereby connecting the power source 64 to the heater 60. The thermistor 70, of course, can be connected to additional control circuitry, not shown herein for purposes of simplicity, or can be used to control an SCR power supply for the heater 60. Alternatively, instead of controlling the resistance heater 60 by means of the thermistor 70, it also can be controlled by means of a pressure switch 72 connected to the outlet side of the heat exchanger 42, the arrangement being such that when the pressure of the refrigerant falls as a result of falling ambient air temperature, the switch 72 will close to energize the heating element 60.

Figure 2:
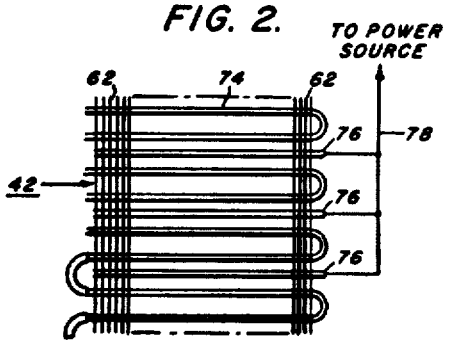
FIG. 2 illustrates one manner in which resistance heating elements may be disposed in intimate thermal contact with the fins of an outdoor evaporator.

One possible arrangement for placing the heating element 60 in contact with the fins of the heat exchanger 42 is shown in detail in FIG. 2. Winding through the fins 62 is a serpentine coil 74. To insure good thermal contact between the heating means and the fins, a plurality of electrical resistance heaters 76 is disposed throughout the length of the heat exchanger 42 in thermal contact with the surfaces of fins 62 and in-between the turns of the coil 74. These, then, are all adapted to be connected in parallel to the common power source 64 via lead 78.

Figure 3:
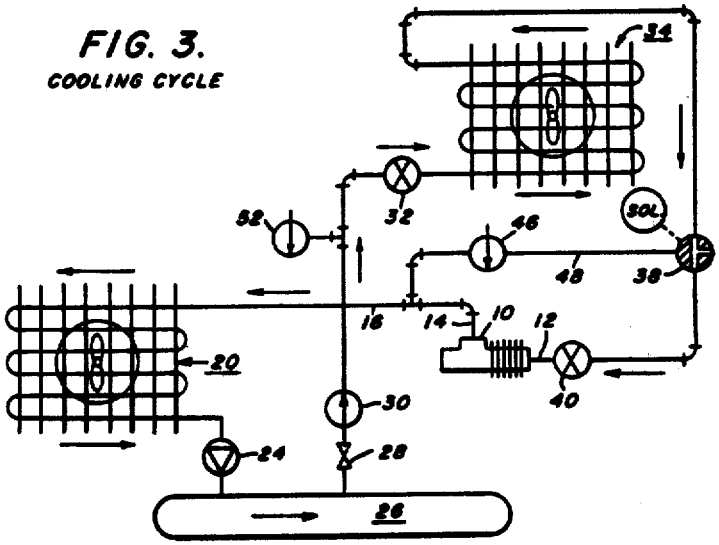
FIG. 3 is a partial schematic diagram of the system of the invention showing the cooling cycle.

The flow of refrigerant through the system during a normal cooling cycle is shown in FIG. 3. Valves 52 and 46 are closed at this time; solenoid valve 38 is in the position shown so as to connect the inlet side 12 of the compressor 10 to the outlet of the indoor coil 34; and valve 30 is open. Under these circumstances, refrigerant from the outlet side of the compressor 10 flows along the direction the arrows through the heat exchanger 20, which now acts as a condenser, the receiver 26, open valve 30, expansion device 32, and the indoor heat exchanger 34 which now acts as an evaporator back to the compressor through valves 38 and 40. This, of course, is a conventional and normal refrigeration cycle.

Figure 4:
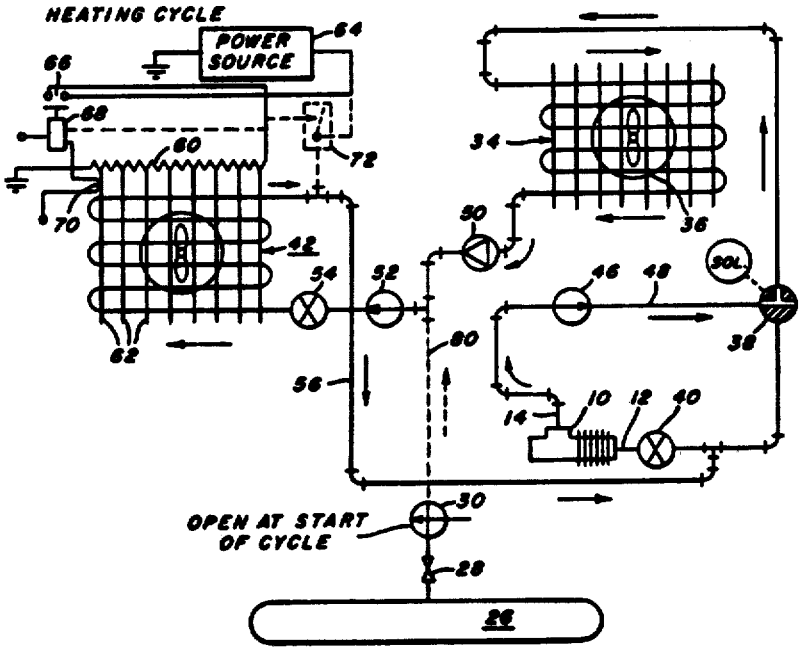
FIG. 4 is a partial schematic diagram of the system of the invention showing the heating cycle.

The flow of the refrigerant during a heating cycle is shown in FIG. 4. As was explained above, at the beginning of a heating cycle, the pressure in receiver 26 may initially exceed the pressure in coil 34. That pressure, which would exist in conduit 80, would cause the condensate formed in coil 34 to accumulate. The result would be that the coil 34 would rapidly fill up with liquid refrigerant and deprive the remainder of the system of its charge without performing any useful heating function. Accordingly, in the present invention, the valve 30 is maintained open at onset of the heating cycles for a predetermined short period of time during which liquid refrigerant is permitted to flow from receiver 26 through open valve 52, expansion valve 54, heat source coil 42 and conduit 56 back to the inlet 12 of the compressor 10, thereby forming a complete cycle. During this short period, which typically may be set for 2 minutes, the condensing pressure in the indoor coil 34 is permitted to build up while the liquid pressure in receiver 26 falls. At the same time, a sufficient refrigerant charge is provided for the active heating circuit.

At the end of this "charging cycle" of about 2 minutes, the liquid solenoid valve 30 closes and liquid refrigerant condensed in the indoor coil 34 is now free to flow through check valve 50 and open valve 52 to the heat source coil 42. To prevent any possibility of overloading the compressor when the ambient temperature at the heat source is relatively high, the suction pressure regulating valve 40 is provided and is adjusted for an outlet pressure not to exceed the maximum suction pressure for which the particular compressor is designed.

As was explained above, the invention incorporates means for protecting the compressor from liquid floodback when changeover occurs from the heating cycle to the cooling cycle. Conditions which exist during the pump-down operation before changeover to cooling are illustrated in FIG. 5. At this time, the liquid solenoid valve 30 and the suction shut-off valve 38 are still in the position shown in FIG. 4 for the heating cycle. Under these conditions, a changeover pressure switch, hereinafter described, permits the hot gas solenoid valve 46 to close but prevents the liquid solenoid valve 30 from opening until the pressure in the indoor coil 34 has been reduced to a predetermined low value, indicating that no liquid has remained in the indoor coil 34. During this changeover period, refrigerant proceeds from the discharge 10 to the conduit 16, condenser 20 and check valve 24 back to the receiver 26. At the same time, the indoor coil 34 is evacuated and its refrigerant pressure is reduced through the check valve 50, open solenoid valve 52, expansion valve 54, heat source coil 42 and conduit 56 back through the suction pressure regulating valve 40 to the compressor 10. Once the pressure in the indoor coil 34 has been reduced to a satisfactory low level, however, liquid solenoid valve 30 opens and suction shut-off valve 38 reverses to the position shown in FIG. 3, while heat source valve 52 closes.

The electrical control for the refrigerant system just described is shown in FIG. 6. It includes two power leads 82 and 84 connected to a source of potential, now shown. The control operation will first be explained for the cooling cycle as shown in FIG. 3. The changeover pump-down switch CH is in the "low" position. Switch CH is in the low position when the pressure in indoor coil 34 is below a predetermined value and in the "hi" position when the pressure is above that value. If there is a demand for cooling, a thermostat CT makes contact, thereby energizing the liquid line solenoid valve 30. This causes an increase in pressure in the evaporator 34, which is transmitted to a low pressure cutout LPC which closes, thereby energizing the compressor motor contactor C. An auxiliary interlock contact C-1 of contactor C energizes the condenser fan contactor CFC, thereby energizing the fan 22 of FIG. 1 providing that the condenser pressure switch FCC is closed. In intermediate climates, it is likely that the switch FCC will be open upon start-up; however it will eventually close after the compressor has operated for a short period of time and an adequate condenser pressure has been built up to close the switch FCC. All other controls shown in FIG. 6 to the right of a heating thermostat MHS are deenergized and inactive during the cooling cycle. Suction shut-off valve 38 and solenoid valve 52 are deenergized and assume the positions shown in FIG. 3 since the changeover switch CH is in the low position and the contactor C3 is deenergized such that contacts C3-1 are open.

When the cooling thermostat CT is satisfied, it breaks contact, thereby deenergizing solenoid valve 30. As a result, the evaporator 34 is rapidly evacuated causing a drop in pressure at the control LPC which breaks and deenergizes the compressor contactor C. Contactor interlock contacts C-1 break, deenergizing the fan motor contactor CFC at the condenser or heat sink coil 20. After a sufficient shut-down period, the pressure at the compressor discharge will drop sufficiently to also open condenser pressure control switch FCC.

If the temperature in the conditioned space drops further, say 10° below the setting of cooling thermostat CT, heating thermostat MHS makes contact, thereby energizing contactor C3 which closes contacts C3-1. This reverses the position of suction cut-off valve 38 and energizes solenoid valve 52 to open the same. At the same time, when the heating thermostat MHS makes contact, current is supplied to a time delay relay TD; however it is not actuated for a period of about 2 minutes. As a result, and since contactor C3 is now energized, contacts C3-2 are closed to complete a circuit to solenoid valve 30 through normally-closed contacts TD-1 of the time delay relay TD and contacts C3-1. Thus, the solenoid valve 30 remains open at this time and feeds liquid refrigerant through solenoid valve 52 which is also open at the same time to heat source coil 42 and back to the suction line, raising the suction pressure sufficiently to actuate the switch LPC which, in turn, energizes the compressor contactor C. Contactor FSC is also energized at the onset of the heating cycle so that the contactor CFD is energized to energize or start the motor for heat source fan 44 through contacts C-2 of contactor C and contacts FSC-1 of contactor FSC which is also energized.

After a short period of time, approximately 2 minutes, time delay relay TD deenergizes, thereby opening contacts TD-1 and deenergizing or closing the solenoid valve 30. In the meantime, the discharge pressure in indoor coil 34 has been raised sufficiently to condense liquid in this coil and feed it through check valve 50, open solenoid valve 52, expansion valve 54, outdoor heat source coil 42 and conduit 56 back to the compressor 10 from where the refrigerant is discharged through the open solenoid valve 46 and valve 38 back to the indoor coil 34, completing the cycle.

Changeover switch CH has now switched to the high position since the refrigerant pressure in the indoor coil 34 has been raised sufficiently to cause this action. If the ambient temperature at the outdoor coil drops near 32°, thermostat LAT (schematically illustrated as thermistor 70 in FIG. 1) will make contact, thereby energizing heating contactor HC which will close contacts HC-1. Now, current flows from the heating thermostat MHS through an air-flow switch contact AFS which is maintained closed by the outdoor coil fan 44 to the contactor 68 for the heating coil 60 which transmits heat to the surface of the fins 62.

When the heating thermostat MHS is satisfied, it breaks contact, thereby deenergizing the contactors HC and 68 for heating coil 60 as well as the hot gas valve 46 so that the supply of refrigerant to the indoor coil 34 is interrupted. Since the compressor 10 continues to operate temporarily, both the indoor coil 34 and the heat source coil 42 will shortly be evacuated, causing the pressure at the compressor suction intake to drop below the setting of low pressure switch LPC. This switch now breaks, deenergizing the compressor contactor C and through its interlock contacts C-2 the outdoor heat source fan contactor CFD. After the indoor coil 34 and heat source coil 42 are fully evacuated, the changeover switch CH will switch to its low position, deenergizing heat source solenoid valve 52 and suction line valve 38, restoring them to their positions shown in FIG. 3. If, on the other hand, the changeover from the heating cycle to the cooling cycle takes place suddenly and before the changeover pump-down switch has reached its low position, refrigerant flow temporarily will proceed through coils 34 and 42 as shown in FIG. 5 (since valves 38 and 52 are still energized) until the indoor coil has been fully evacuated and the changeover switch has been signaled to switch to its low position.

Although the invention has been shown in connection with a certain specific embodiment, it will be readily apparent to those skilled in the art that various changes in form and arrangement of parts may be made to suit requirements without departing from the spirit and scope of the invention.

I claim as my invention:

1. In a heat pump, the combination of:

an indoor heat exchanger, first and second outdoor heat exchangers, a compressor, a receiver, conduit means interconnecting said heat exchangers, said receiver and said compressor, expansion valve means for said indoor heat exchanger and the first of said outdoor heat exchangers, valve means in the conduit means, said valve means having a first condition in which the output of the compressor is connected through the second of said outdoor heat exchangers, the receiver, the expansion valve means for the indoor heat exchanger and said indoor heat exchanger back to the input of the compressor whereby the indoor and outdoor heat exchangers act as an evaporator and condenser, respectively, the valve means having a second condition in which the output of the compressor is connected through said indoor heat exchanger, the expansion valve means for the first outdoor heat exchanger and said first outdoor heat exchanger back to the input of the compressor whereby the indoor and outdoor heat exchangers act as a condenser and an evaporator, respectively,

[electrical resistance] heating means in intimate contact with fins on said first outdoor heat exchanger whereby heat can be transferred from the heating means to the fins by conduction, and means for [energizing] *causing* said heating means *to supply heat to the fins* whenever the temperature of the fins reaches a point where frost can form thereon, whereby the fins are maintained free of frost regardless of the ambient temperature.

2. The heat pump of claim 1 wherein said heating means [is energized] *supplies heat to the fins* when the temperature of the fins falls below 32° F.

3. The heat pump of claim [2] *5* wherein said means for energizing said heating means comprises thermistor means in contact with said fins, and means for supplying electrical power to said heating means when the temperature sensed by said thermistor means falls below said predetermined value.

4. The heat pump of claim 1 wherein said heating means comprises a plurality of heating elements spaced along said one outdoor heat exchanger, each heating element being in intimate contact with the outdoor heat exchanger surface to transfer heat thereto by conduction.

*5. The heat pump of claim 1 wherein said heating means comprises an electrical resistance heater, and including means for energizing said electrical resistance heater to supply heat to the fins when the temperature of the fins reaches a point where frost can form thereon.*

* * * * *